United States Patent Office 3,642,829
Patented Feb. 15, 1972

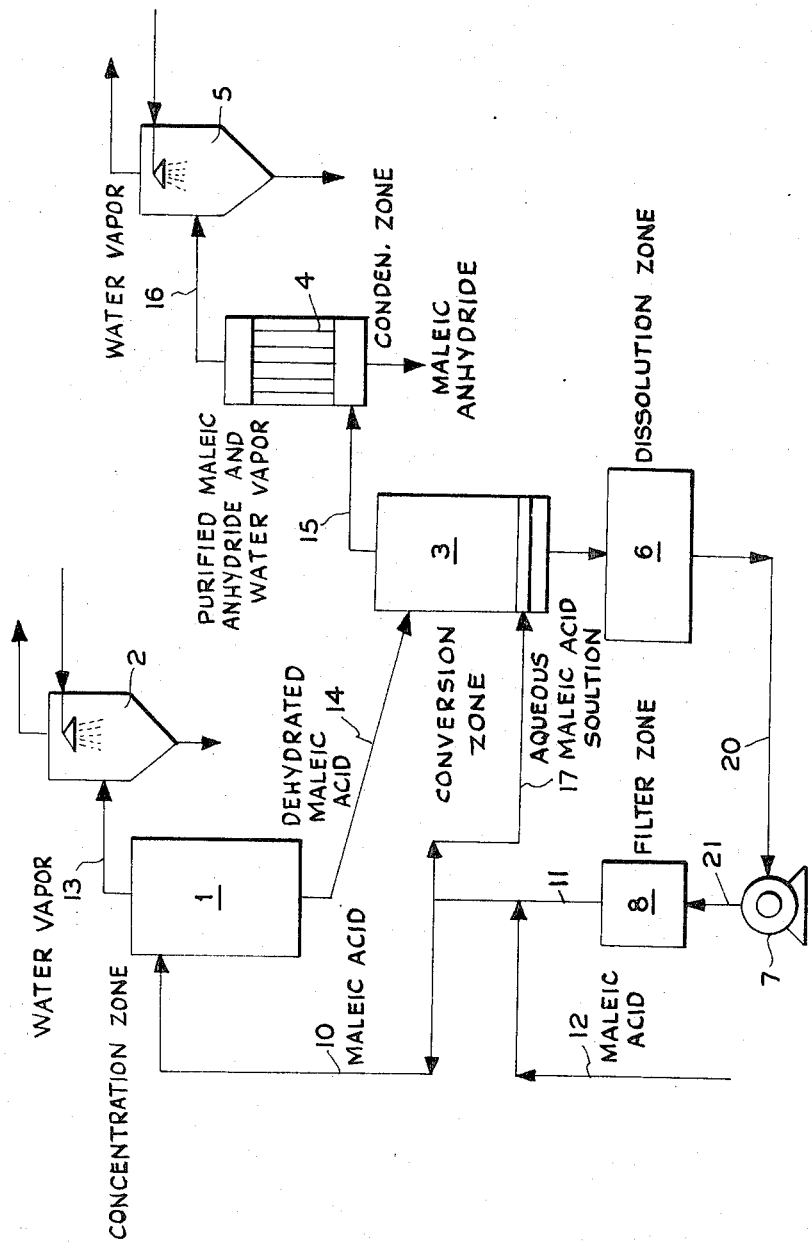

3,642,829
CONTINUOUS PROCESS FOR THE PREPARATION OF MALEIC ANHYDRIDE FROM AN AQUEOUS SOLUTION OF MALEIC ACID BY DISTILLATION
Ernest Weyens, Berchem-Ste.-Agathe, Belgium, assignor to UCB, Société Anonyme, Saint-Gilles-lez-Brussels, Belgium
Filed Jan. 27, 1970, Ser. No. 6,224
Claims priority, application Great Britain, Jan. 30, 1969, 5,221/69
Int. Cl. B01d 3/34; C07c 51/56, 57/14
U.S. Cl. 260—346.8                    12 Claims

ABSTRACT OF THE DISCLOSURE

Continuous process for the preparation of maleic anhydride which comprises:
(a) concentrating a maleic acid solution (e.g. from washing effluent of catalytic oxidation of benzene) at 100–150° C. and 400–760 mm. Hg;
(b) converting the dehydrated maleic acid from (a) at 150–200° C. and 40–300 mm. Hg into a liquid phase of impure maleic acid and a purified gaseous phase of maleic anhydride and water vapour;
(c) treating the liquid phase from (b) with maleic acid, filtering off the impurities including any fumaric acid and either recycling the purified maleic acid filtrate partly to (a) and partly to (b) or removing said filtrate from the system;
(d) condensing the gaseous phase from (b) at a temperature above the dewpoint of water giving substantially pure maleic anhydride and washing the residual vapour with water and eventually recycling the solution containing maleic acid to (a).

---

The present invention is concerned with a process for the dehydration of maleic acid to form maleic anhydride and, more particularly, with the recovery of maleic anhydride from a maleic acid solution obtained in the production of maleic anhydride by the catalytic oxidation of hydrocarbons, particularly benzene.

In the gaseous effluent of the reactor, the maleic anhydride vapours are highly diluted with a mixture of inert gases, such as nitrogen, unconsumed oxygen and the like. Although the vapour pressure of the maleic anhydride amounts to only a few mm. mercury at the melting temperature of the product, the dilution is such that at least 15% of the anhydride leaving the reactor evades condensation by cooling and, in practice, can consequently be recovered only by absorption in a solvent, which is generally water. In other words, in practically all processes actually used on an industrial scale, at least part of the anhydride will finally be recovered in the form of an aqueous solution of maleic acid.

All processes hitherto described for the dehydration of maleic acid to maleic anhydride encounter various practical difficulties, which obviously vary from one process to another. A difficulty which is not overcome in any known process results from the inevitable presence of two types of impurities, one being due to the presence of intermediate products of the oxidation of benzene to maleic anhydride and the other being due to impurities, particularly fumaric acid, formed in the course of the dehydratation of the maleic acid solution.

These two types of impurities are invariably concentrated either in all the maleic anhydride produced or in only a part of the latter; in either case, the problem arises of separating these impurities from the maleic anhydride entraining them. This operation is delicate and, in addition, inevitably entails more or less considerable losses of maleic anhydride. These impurities, indeed, retain a not inconsiderable amount of maleic anhydride. In processes employing exhaustion by distillation, there are additional losses due to the decomposition and isomerisation which accompany this operation.

At the present time, the most usual process for the recovery of maleic anhydride consists in subjecting the reactor effluent to partial condensation at a temperature higher than the dewpoint of water vapour, in order to recover part of the maleic anhydride directly, and then washing the gaseous effluent either with solvents which selectively absorb the residual maleic anhydride or with water, with simultaneous conversion of the anhydride into maleic acid.

A disadvantage of the process using selective solvents is, on one hand, the danger of fire and intoxication, the inevitable losses of solvents in the course of their recycling and the poor calorific efficiency due to their low specific heat compared with that of the water to be evaporated and, on the other hand, the obligatory periodic stopping of the installation in order to eliminate the deposits of fumaric acid which are formed in the course of time.

Among the processes in which part of the maleic anhydride is recovered in the form of an aqueous solution of maleic acid, some processes previously effect partial or complete elimination of the water of dissolution and then introduce the maleic acid, partly or completely dehydrated in this manner, into a considerable mass of boiling maleic anhydride, so as to obtain a vaporised mixture containing maleic anhydride and water, which is then subjected to condensation, which may or may not be fractional, at a temperature higher than the dewpoint of the water vapour present in the system. According to the inventors of this known process, the quality of the maleic anhydride which can thus be obtained is generally excellent; nevertheless, it is a disadvantage that the calorific energy and operating power requirements for constantly maintaining the maleic anhydride mass in circulation at a high temperature are considerable; furthermore, at high temperatures, not inconsiderable amounts of fumaric acid are formed and accumulate in the evaporator and these have to be removed periodically, thus entailing a non-continuous operation of the installation.

In other processes for the recovery of the residual anhydride in the form of an aqueous solution of maleic acid, direct conversion of the acid into anhydride is effected without making use of a heated mass of circulating maleic anhydride. It is obvious that this technique is much less expensive than that described above; however, this direct conversion is delicate because it is necessary to heat the reaction mixture to a high temperature, at which partial isomerisation of the maleic acid into fumaric acid inevitably occurs, which not only constitutes a loss of output but also involves a risk of obstructing the installation. Furthermore, up to the present time, no means have yet been found for continuously eliminating the contaminants from the system, for example traces of catalysts, resins and the by-products which either are formed in the synthesis reactor and then are found in the aqueous absorption solution or are formed in the recovery installation, such as fumaric acid, without having to interrupt the continuous production for the purposes of cleaning, and while still obtaining a maleic anhydride product of great purity and practically free from maleic acid and/or fumaric acid.

It is the provision of a solution of this problem which constitutes the object of the present invention.

According to the present invention, maleic anhydride is obtained, with a purity of at least 99% and with a fumaric acid content of 0–0.1% by weight, when maleic anhydride is continuously recovered from a maleic acid solution by the following operational steps:

(a) The maleic acid solution is heated in a concentration zone at a temperature of between 100 and 150° C. and at a pressure of between 400 and 760 mm. Hg in order to reduce the water content of the maleic acid to 0–10% by weight;

(b) The maleic acid obtained in stage (a) is treated in a conversion zone at a temperature of between 150 and 200° C. and at a pressure of between 40 and 300 mm. Hg in order to convert from 10 to 97%, advantageously 85 to 95%, and preferably about 90% by weight of the maleic acid into maleic anhydride, to give a liquid phase of impure maleic acid and a purified gaseous phase containing maleic anhydride and water vapour;

(c) The impure liquid phase produced in stage (b) is treated with an aqueous solution of maleic acid in a dissolution and filtration zone in order to obtain a solid residue containing the impurities and any fumaric acid which may have been formed, which are removed from the system, and a filtrate consisting of an aqueous solution of purified maleic acid, which can be recycled partly to stage (a) and partly to the impure liquid phase produced in stage (b) or which, if desired, can be removed from the system;

(d) In a condensation zone, the gaseous phase consisting of maleic anhydride and water vapour produced in stage (b) is condensed at a temperature higher than the dewpoint of the water vapour present in the gaseous phase and, as a product of the process, there is obtained maleic anhydride with a purity of at least 99% and containing 0–0.1% by weight of fumaric acid; the residual vapour is washed with water and the solution thus obtained and containing maleic acid is optionally returned to stage (a).

The aqueous maleic acid solution used as starting material for the process according to the present invention is that obtained by washing the effluent of a catalytic oxidation reactor for hydrocarbons, particularly benzene, after part of the maleic anhydride has been condensed. Nevertheless, according to a particularly advantageous embodiment of the present invention, it is also possible to retain all the maleic anhydrides formed in the reactor, in the form of an aqueous solution of maleic acid, by washing with water, i.e. without partial condensation of maleic anhydride. This latter embodiment is very advantageous because it makes it possible to eliminate entirely the cost of investment necessary for maleic anhydride condensers, which normally represent 15 to 25% of the total investment costs for the maleic anhydride recovery installation.

Whatever the method of operation adopted, i.e. partial or total extraction with water of the maleic anhydride in the form of an aqueous solution of maleic acid, any concentrations of maleic acid in the aqueous solution thus obtained may be used for carying out the process of the present invention; nevertheless, for economic reasons, it is obvious that this concentration should be as high as possible and that it will preferably be close to saturation concentration under the operating conditions used for the washing. Thus, as an indication, the concentration of maleic acid in the aqueous solution may be about 450 grams per litre but it is obvious that other concentrations may be used, without departing from the scope of the present invention.

The concentration zone referred to in (a) may be constituted by one or more evaporator apparatus of known type; however, preference is given to the so-called thin layer evaporators. In this concentration zone, the temperature is kept between 100 and 150° C., preferably at about 135° C. while the pressure is maintained between 400 and 760 mm. Hg, preferably at about 500 mm. Hg in order to lower the water content of the maleic acid to 0–10% by weight. For the good performance of the process it is advantageous to lower the water content of the solution to as low a value as possible; it is even possible to continue the dehydratation a little further than 100%, i.e. to commence the conversion of maleic acid into maleic anhydrides. The residence time of the maleic acid in the concentration zone is advantageously from 0.1 to 5 minutes, preferably less than 1 minute. The partially or completely dehydrated maleic acid at the outlet of the concentration zone is in the form of a liquid and its temperature is between 125 and 150° C. Because of the mild operating conditions applied in the concentration zone and of the short residence time, the presence of fumaric acid in the maleic acid obtained in this manner is practically undetectable.

The resulting hot maleic acid is passed to a conversion zone, which may be constituted by one or more evaporators of known type but preferably of the so-called thin layer type. In this conversion zone, the operating conditions are more severe than in the concentration zone, so as to permit elimination of the constitutional water from maleic acid and thus to convert the acid into maleic anhydride. However, as has been mentioned above, there is a danger of the formation of fumaric acid when maleic acid is heated at excessively high temperatures. For this reason, according to the present invention, sufficiently moderate operating conditions are adopted for the conversion zone in order to ensure that the maleic acid is only partly converted maleic anhydride and, in addition, the operation is so conducted as to be able to separate in this zone not only the fumaric acid which may be formed in the course of the conversion but also all the impurities which accompany the maleic acid, i.e. traces of secondary products originating from the catalytic oxidation reactor, particularly resinous products, benzoquinone and the like. For this purpose, the conversion of maleic acid in the zone is effected at a temperature of between 150 and 200° C. and at a pressure of between 40 and 300 mm. Hg, in order to convert from 10 to 97%, advantageously from 85 to 95% and preferably about 90% by weight of the maleic acid into maleic anhydride, thus forming a liquid phase of maleic acid containing the above-mentioned impurities, any fumaric acid formed and the like, which is continuously eliminated at the bottom of the conversion zone, and a purified gaseous phase containing maleic anhydride and water vapour, which leaves the conversion zone at the top. In order to avoid excessive formation of fumaric acid, which, even if it does not contaminate the maleic anhydride, since it is eliminated with the unconverted maleic acid, nevertheless constitutes an irrecoverable loss of output, the residence time of the material in the conversion zone is as short as possible and is generally less than 1 minute.

As indicated above, it would be possible to convert only 10% of the maleic acid into maleic anhydride, while, nonetheless, obtaining the advantageous effects of the process of the present invention. It will, however, be understood that, from the point of view of thermal and economic balances, the amount of unconverted maleic acid should be reduced to the minimum. Pilot plant scale tests have shown that it is possible to obtain a maleic anhydride of excellent quality, with a purity higher than 99% and containing from 0 to 0.1% by weight of fumaric acid, when the content of unconverted maleic acid in the conversion zone amounts to about 10% by weight. Finally, if it is desired to do so, it is also possible to effect the conversion of maleic acid into its anhydride in the conversion zone in the presence of known dehydration catalysts, although this step is by no means necessary in order to obtain the advantages of the process of the present invention.

The impure liquid phase, which contains the impurities present in the original aqueous solution of maleic acid or formed in the course of the conversion of the maleic acid into its anhydride in the conversion zone, including any fumaric acid formed, is withdrawn continuously at the bottom of the conversion zone and passed to a dissolution and filtration zone, in which the solid impurities are separated in the form of a filter cake from a liquid filtrate constituted by purified aqueous maleic acid, which may be recycled partly to the concentration zone and partly to the liquid phase of impure maleic acid leaving the conversion zone. Nevertheless, it is also possible to withdraw the purified aqueous solution of maleic acid from the system, for example in order to use it as raw material for another synthesis.

The purified gaseous phase containing maleic anhydride and water vapour and produced in the conversion zone, is passed into a condensation zone in which, on the one hand, the maleic anhydride is condensed at a temperature above the dewpoint of the water vapour contained in this phase and, on the other hand, the uncondensed portion of the gaseous phase is washed with water in order to recover, in the form of an aqueous solution of maleic acid, the maleic anhydride which remains in the uncondensed portion. The maleic anhydride condensed in the aforesaid condensation zone constitutes the product of the present process; its purity amounts to at least 99% and its fumaric acid content is from 0 to 0.1%. Nevertheless, in order to impart to it the degree of purity and stability imposed by commercial standards, this product can easily be treated by suitable, well-known methods, particularly by vacuum distillation. On the other hand, the aqueous solution of maleic acid obtained by washing the gaseous phase may be recycled to the top of the concentration zone.

In the process according to the present invention, the yield of maleic anhydride obtained from the maleic acid solution used as starting material is very high, since it attains at least 98–99% of theoretical yield.

The following example is given for the purpose of illustrating the present invention, reference being made to the accompanying drawing which shows a flow diagram of the process.

EXAMPLE

Referring to the accompanying drawing, an aqueous solution of 450 g./litre maleic acid originating from a washer (not illustrated) installed at the outlet of a reactor for the catalytic oxidation of benzene (not illustrated) is fed a the rate of 1000 moles per hour through a pipe 10 to the top of a thin layer evaporator 1. These 1000 moles per hour of maleic acid are made up of 900 moles per hour of aqueous maleic acid coming from the washer (not illustrated) through a pipe 12 and 100 moles per hour of maleic acid coming from a mixing zone 6 and filtration zone 8 and through a pipe 11.

The water vaporised from the aqueous solution of maleic acid at a temperature of 135° C. and at a pressure of 550 mm. Hg in the evaporator 1 escapes through a pipe 13 and is condensed in the barometric washer 2 connected to a vacuum source (not illustrated), while the maleic acid, which now only contains about 1% by weight of water, leaves at the bottom of the evaporator 1 at a temperature of 135° C. and is passed through a pipe 14 to the top of a second thin layer evaporator 3.

In the evaporator 3, in which the melted maleic acid is gradually brought to a temperature of 200° C. at a pressure of 150 mm. Hg, the maleic acid is converted, to an extent of 90% by weight, into maleic anhydride in the form of a vaporised mixture of maleic anhydride and water, while the remaining 10% of unconverted maleic acid flows off in the form of a liquid phase to the bottom of the evaporator 3.

The water vapour and maleic anhydride vapour are passed through a pipe 15 into a condenser 4 operating at a temperature of 80° C. The maleic anhydride obtained as product of the process is collected in the liquid state at the base of the condenser 4 at the rate of 990 moles per hour; its maleic anhydride content is 99.5%, its content of fumaric acid is practically nil and its content of other impurities amount to 0.4% by weight. If necessary, the maleic anhydride thus obtained is passed into a distilling column (not shown), in order to be freed from the last traces of impurities, and is stabilised. The water vapour which escapes at the top of the condenser 4 is passed through a pipe 16 to a barometric washer 5 connected to a vacuum source (not shown), in order to recover traces of maleic anhydride entrained by the water vapour; the resulting aqueous solution of maleic acid may be recycled (not illustrated).

The liquid phase of maleic acid, which flows off at the bottom of the evaporator 3 and which contains, in suspension, all the impurities accumulated in the installation, is mixed with a part of the maleic acid solution circulating in the cycle 6, 20, 7, 21, 8, 11, 17, 3 and is collected in a receiver 6. This receiver operates at a temperature of 30° C. and at a pressure of 40–300 mm. Hg. The solution is withdrawn from 6 through a pipe 20 by means of a pump 7 and delivered through a pipe 21 to a filter 8. The filter 8 is designed so as not to interrupt the continuous operation of the installation (double filtration circuit (not illustrated). The filter cake, which contains the impurities accumulated in the system (including fumaric acid and various impurities originating from secondary reactions on the catalyst), is eliminated from the installation, while the filtrate, composed of an aqueous solution of maleic acid, leaves the filter through the pipe 11 and is mixed with a fresh solution of maleic acid to be treated, arriving through pipe 12.

The process according to the present invention, is therefore, very clearly distinguished from all previously known processes by the fact that it makes it possible:

(1) to convert maleic acid directly into maleic anhydride and to separate the impurities, without the latter being mixed with the maleic anhydride, because they are entrained by the fused maleic acid;
(2) to evacuate the impurities continuously and practically without loss of anhydride or of maleic acid.

The advantages offered by the process of the present invention are numerous:

(a) A maleic anhydride is obtained, the purity of which is at least 99%, with a fumaric acid content of 0–0.1%.
(b) The yield of maleic anhydride is very high and attains from 98 to more than 99% of the theoretical value.
(c) The impurities are eliminated from the installation continuously, without ever having to stop the installation for cleaning purposes, as is the case with previously known installations.
(d) Because of the almost theoretical yield of the process, it is possible to eliminate the condensers which are generally installed at the outlet of the reactor, in order to condense the maleic anhydride direct from the effluent, which represents a saving of about 15–25% of the total investment costs.
(e) The operation of the installation is flexible, in that the operating conditions can be modified in accordance with the initial degree of purity of the maleic acid solution to be treated.
(f) Unlike certain known processes, it is not necessary to keep in circulation a considerable heated mass of maleic anhydride; the economy of the process is, therefore, improved, the danger of formation of fumaric acid is reduced to a minimum and the yield of the operation of recovery of maleic anhydride is increased accordingly.

I claim:

1. Continuous process for the preparation of maleic anhydride from an aqueous solution of maleic acid, which comprises
    (a) heating the maleic acid solution in a concentration zone at a temperature of between 100 and 150° C. and at a pressure of between 400 and 760 mm. Hg in order to reduce the water content of the maleic acid to 0–10% by weight;

(b) treating the maleic acid obtained in stage (a) in a conversion zone at a temperature of between 150 and 200° C. and at a pressure of between 40 and 300 mm. Hg in order to convert from 10 to 97% by weight of the maleic acid into maleic anhydride, to give a liquid phase of impure maleic acid and a purified gaseous phase containing maleic anhydride and water vapour;

(c) treating the impure liquid phase produced in stage (b) with an aqueous solution of maleic acid in a dissolution and filtration zone in order to obtain a solid residue containing the impurities and any fumaric acid which may have been formed, which are removed from the system, and a filtrate consisting of an aqueous solution of purified maleic acid;

(d) condensing in a condensation zone the gaseous phase consisting of maleic anhydride and water vapour produced in stage (b) at a temperature higher than the dewpoint of the water vapour present in the gaseous phase, thus obtaining maleic anhydride as a product of the process with a purity of at least 99% containing 0–0.1% by weight of fumaric acid.

2. Continuous process according to claim 1, wherein the aqueous maleic acid solution in stage (a) is heated at a temperature of about 135° C. and at a pressure of about 500 mm. Hg.

3. Continuous process according to claim 1, wherein from 85% to 95% by weight of the maleic acid is converted into maleic anhydride in stage (b).

4. Continuous process according to claim 1, wherein 90% by weight of the maleic acid is converted into maleic anhydride in stage (b).

5. Continuous process according to claim 1, in which the maleic acid solution used as starting material is that obtained by washing the effluent of a catalytic oxidation reactor for hydrocarbons, after part of the maleic anhydride has been condensed.

6. Continuous process according to claim 1, in which the maleic acid solution used as starting material is that obtained by washing the effluent of a catalytic oxidation reactor for benzene, after part of the maleic anhydride has been condensed.

7. Continuous process according to claim 1, in which the maleic acid solution used as starting material is that obtained by washing the effluent of a catalytic oxidation reactor for hydrocarbons, without partial condensation of maleic anhydride.

8. Continuous process according to claim 1, in which the maleic acid solution used as starting material is that obtained by washing the effluent of a catalytic oxidation reactor for benzene, without partial condensation of maleic anhydride.

9. Continuous process according to claim 1, in which the concentration zone of stage (a) is constituted by at least one thin layer evaporator.

10. Continuous process according to claim 1, in which the conversion zone of stage (b) is constituted by at least one thin layer evaporator.

11. Continuous process according to claim 1, in which the maleic anhydride obtained as the product of the process at stage (d) is subjected to vacuum distillation.

12. Continuous process according to claim 1, wherein the aqueous solution of purified maleic acid produced in stage (c) is recycled partly to the concentration zone of stage (a) and partly to the liquid phase of impure maleic acid produced in stage (b).

References Cited

UNITED STATES PATENTS

| | | | |
|---|---|---|---|
| 1,901,914 | 3/1933 | Livingston | 203—15 |
| 1,966,852 | 7/1934 | Dvornikoff | 260—346.8 R |
| 2,340,490 | 2/1944 | Porter | 260—346.8 R |
| 2,670,355 | 4/1958 | Barsky et al. | 260—346.8 R |
| 3,135,669 | 6/1964 | Taggart | 203—78 |
| 3,476,775 | 11/1969 | Sueur | 203—78 |
| 2,832,802 | 4/1958 | Kohn | 260—346.8 R |

WILBUR L. BASCOMB, Jr., Primary Examiner

U.S. Cl. X.R.

203—15, 39, 47, 72, 78, 80, 89, 91